Patented Sept. 8, 1942

2,294,984

UNITED STATES PATENT OFFICE 2,294,984

PROCESS FOR PRODUCING AND DISTILLING ALIPHATIC ACIDS

Rudolph Leonard Hasche, Kingsport, Tenn., assignor to Eastman Kodak Company, Rochester, N. Y., a corporation of New Jersey No Drawing. Application June 29, 1939, Serial No. 281,899

5 Claims. (Cl. 260—530)

This invention relates to processes for the production and treatment of aliphatic acids above acetic acid and more particularly to the production and distillation of butyric acid.

This application is a continuation-in-part of my allowed application 34,215, now Patent No. 2,173,111.

N-butyric acid, sometimes referred to as ethyl acetic acid or butanic acid, has the empirical formula $C_4H_8O_2$. There are also other higher acids such as valeric acid and iso-valeric acid, which may be obtained from corresponding aldehydes.

As pointed out in my Patent No. 2,173,111, these compounds are used in a number of ways industrially. For example, propionic and butyric acids may be employed in the manufacture of cellulose acetate propionate and cellulose acetate butyrate. Or, the acids might be employed in preparing acid chlorides or various acid salts used as mordants in dyeing processes.

Such acids are, in many instances, not obtainable in particularly large quantities. For example, butyric acid may be obtained to some limited extent from fermentation processes. Propionic acid may be obtained in small quantities from treating pyroligneous liquor. It is therefore apparent that to produce these higher acids in an efficient commercial manner, is a highly desirable result.

I have developed a new continuous process for converting aldehydes above acetaldehyde and in particular 4 carbon-atom aldehydes to acids, together with new catalysts and related means for accomplishing the following objects.

This invention has for one object to provide a continuous catalytic process for producing aliphatic acids having at least 3 carbon atoms. Another object is to provide a process wherein propionic, butyric and other higher acids produced may be recivered at temperatures below their boiling points. Another object is to provide a catalytic process for treating freshly distilled aldehydes such as propionaldehyde and butyraldehyde.

Still another object is to provide a novel catalyst solution which is particularly adapted for use in the conversion of aldehydes containing at least 3 carbon atoms to the corresponding aliphatic acid. Another object is to provide a method of preparing an activated catalyst solution adapted for the treatment of aldehydes having at least 3 carbon atoms. Other objects will appear hereinafter.

In accordance with my preferred process, aldehyde may be substantially continuously produced, separated and converted to the corresponding acid by oxidation in the presence of my new cobalt catalyst employed in suitable oxidation apparatus. For example, propionic aldehyde may be obtained from propyl alcohol and this aldehyde, preferably in a freshly distilled condition, oxidized to propionic acid with a high yield of acid.

Suitable oxidation apparatus for carrying out my invention is shown in my Patents Nos. 2,173,111 and 2,159,988. The catalyst unit would, in general, comprise an elongated column adapted to contain an acid solution, as for example, a butyric acid-catalyst solution. The lower portion of the column is provided with suitable inlet means through which the aldehyde to be oxidized together with oxidation medium, may be introduced and dispersed. The column would be equipped with temperature controlling means such as internal coils, jackets or the like. The upper portion of the column would be provided with suitable means for permitting the separation from the catalyst solution, of acid produced. The acid liquid produced is preferably subjected to further treatment as for example distillation.

In order to operate my process a suitable oxidation tower as referred to, is filled with a solution preferably containing cobalt salt as a catalyst. I have found that this cobalt catalyst far exceeds all other types of catalyst solution in the preparation, by catalytic oxidation, of acids higher than acetic acid and in particular butyric acid.

My new catalyst is prepared by dissolving a small amount of a cobalt salt soluble in organic acids such as, for example, cobaltous acetate, propionate, carbonate or other salt, in for example propionic acid or butyric acid, depending upon the catalyst solution desired. About 2–5% solution of cobalt propionate in 97%–98% propionic acid would be satisfactory if propionaldehyde is to be treated. It will be noted that it is necessary to activate the solution before it is used as a catalyst. In the example under consideration, activation would be carried out by passing a mixture of propionaldehyde with air (about 100% excess) through the cobaltous solution.

This activation treatment brings about a color change, namely, the solution changes from violet to dark green. For example, about 1200 cubic centimeters of a catalyst solution as above described when treated with a propionaldehyde-air mixture at the rate of 4.5 cubic feet per hour becomes substantially completely activated after about 30 minutes. There was about 16.7% propionaldehyde by volume in the air mixture. The temperature maintained during the activation is preferably between about 40–90° C.

It should be noted that it is important in order to obtain the best conversion that the catalyst solution be kept in a condition corresponding to its state just after activation. This high degree of efficiency may be obtained by supplying air (optionally heated air) if desired under some pressure, for example 15–30 inches of water pressure, to cause oxygen to become dissolved in the catalyst solution, which keeps the catalyst active.

After the apparatus has been assembled and filled with catalyst the production of aliphatic acids may be commenced. The aldehyde to be treated as for example propionic or butyric aldehyde, may be obtained from the catalytic dehydrogenation and/or oxidation of corresponding alcohol to give the aldehyde. Preferably, freshly distilled aldehyde would be supplied to the oxidation unit. The aldehyde would be blown into the unit either in the vaporous or liquid condition through suitable diffusing means in order to distribute the aldehyde through the catalyst solution above described. Air is introduced into the unit, also at the lower part thereof and the aldehyde in the presence of the air becomes quickly oxidized to the corresponding acid. For example, a contact time of not greater than 25 seconds is satisfactory.

The reactions are as follows in the oxidation:

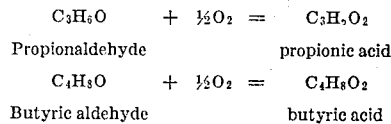

$$C_3H_6O + \tfrac{1}{2}O_2 = C_3H_6O_2$$
Propionaldehyde — propionic acid
$$C_4H_8O + \tfrac{1}{2}O_2 = C_4H_8O_2$$
Butyric aldehyde — butyric acid In the oxidation step I may employ close to the theoretical amount of the oxidizing medium, based on the above equations because the reaction is quite vigorous. Some excess of oxidizing medium such as air is not objectionable but too large an excess may in some instances lead to the formation of undesirable amounts of carbon dioxide and acetic acid in the off gases. Air is the preferred oxidizing medium since it furnishes the diluent constituent, nitrogen.

In the preferred operation of my process, assuming propionic acid, which has a boiling point of about 141° C. is being produced, it is only necessary to maintain the propionic acid-cobalt propionate catalyst at temperatures around 100–110° C. to recover the acid containing vapors as head products therefrom.

This temperature is not necessarily the temperature at which the catalyst is operating but indicates the temperature at which the acids may be boiled off to prevent build-up in the cataylst solution. For butyric acid this temperature range might be from 100°–165° C. As previously indicated, the temperature for operating the catalyst would usually be between 40–90° C.

As indicated, air is employed as the oxidizing medium with or without other diluent materials such as hydrocarbon gases. Since air is comprised roughly of 80% nitrogen and other inert constituents these inert materials and any other diluents which may be added exert a partial pressure effect on the acid vapors, thereby permitting volatilization of the acid vapors at these lower temperatures.

Since the catalyst solution contains acid of the character being produced, in order that the acid removed will not be depleting the catalyst solution, a sight gauge or other device may be placed on the catalyst unit so that the level of the catalyst solution therein may be observed and maintained relatively constant.

If the quantity of catalyst solution with which the tower was originally charged should begin to drop the temperature of the unit would be reduced so that the quantity of the acid vapors being liberated from the unit would be reduced, thereby preventing acid from being removed from the catalyst solution.

The acid containing vapors obtained may be condensed and the condensate of acid such as propionic or butyric acid subjected to distillation in apparatus shown in my Patent No. 2,173,111, aforementioned.

That is, the excess and spent air mixture containing propionic or butyric acid, dependent upon the aldehyde treated and any by-product such as acetic acid, low boiling polymers and the like are preferably led through suitable condensing means to condense the acid component. The gases from this condensation may be passed through a scrubber for eliminating any uncondensed acid.

The crude acid obtained is then preferably subjected to distillation wherein any aldehyde present may be driven off and recovered for further use. Then the pure acid may be driven off and collected in suitable storage tanks.

In the operation of my process other conditions than those specified may be employed. For example, in carrying out the oxidation treatment in apparatus shown in my Patent No. 2,159,988, there may be employed approximately 400–600 pounds of catalyst solution for each catalyst unit. Space velocities from 75–150 when employing about 50% excess air would be satisfactory. As already indicated, I find that excess oxidizing at about this magnitude is desirable for maintaining the catalyst at its peak of activity. However, I do not wish to be limited to this operation, as I have found that various amounts of air from, for example, slightly below the theoretical amount up to and including as high as 50–100% excess, may be employed. The temperature of the oxidation catalyst may be maintained between 50–75° C., 105–115° C. as indicated, or in some instances as high as the boiling point of the acid being produced.

The life of the catalyst, which may comprise an activated cobalt salt in a solution of an aliphatic acid having more than 3 carbon atoms appears to be indefinite when properly conditioned and employed as described herein. As already described above, one suitable catalyst solution will be comprised of a cobalt salt dissolved in butyric acid. The solution would comprise over 90% of butyric acid and would have been activated by blowing with an aldehyde such as butyraldehyde and an oxidizing medium such as air until a color change occurred. While around 2% of the cobalt salt has been indicated, other proportions may be employed as for example up to 8–10%. Higher proportions up to 10% and even 20% may be employed. However, as set forth in the preceding examples, it is preferred that the catalyst solution comprise over 90% of the acid.

My invention is particularly advantageous in that it provides procedure whereby aldehydes containing 3 or more carbon atoms, as for example butyraldehyde, may be converted to butyric acid in very high yields. The resultant acid is of good quality and by the further treatment described herein very excellent grade of acid may be obtained. Inasmuch as the yields are high and the by-products obtained are relatively few, the process gives very satisfactory results.

It is apparent from the foregoing that my invention is susceptible of some modification; hence, I do not wish to be restricted in my invention, excepting insofar as may be necessitated by the prior art and the spirit of the appended claims.

What I claim and desire to be secured by Letters Patent of the United States is:

1. A process of oxidizing butyraldehyde to butyric acid which comprises substantially simultaneously passing butyraldehyde and air through a column of catalyst solution comprising a cobalt salt dissolved in butyric acid, said catalyst solution having been activated to a dark green color by blowing with a gas containing free oxygen, during the process heating at least a part of the activated catalyst solution containing butyric acid formed in the process to a temperature between 100° C. and 165° C., and during the process maintaining the temperature of the catalyst solution at temperatures within the range 100° C.–165° C., which will maintain the volume of the solution substantially constant.

2. A process for oxidizing a four-carbon atom aldehyde which comprises substantially simultaneously passing said aldehyde and air in an amount not greater than about 50% excess at a space velocity between 75 and 150 through a catalyst solution essentially comprised of butyric acid having dissolved therein 2% to 10% of an 8th group metal salt, said catalyst solution having been activated to a dark green color by blowing with air and maintaining at least a part of the catalyst solution which has been so activated and which has oxidation product formed from said aldehyde, at a temperature between 100° C. and 165° C.

3. A process for oxidizing four-carbon atom aldehydes which comprises substantially simultaneously passing said four-carbon atom aldehyde in a freshly distilled condition and excess air into a catalyst solution essentially comprised of a four-carbon atom acid having dissolved therein between 2% and 10% of a cobalt salt, said catalyst solution having been activated to a dark green color by blowing with a gas-containing, free oxygen.

4. The process of producing butyric acid from butyraldehyde which comprises effecting a reaction between butyraldehyde and gaseous oxidizing medium having a content of free oxygen, said reaction being carried out in the presence of a butyric acid catalyst solution having a content of a cobalt butyrate dissolved therein, said catalyst solution having been activated by blowing with air to convert the cobalt to its highest valence and until the solution has become a dark green color, and during the operation of said process subjecting at least a part of the activated catalyst solution to a temperature between 100° C. and 165° C.

5. A process of oxidizing butyraldehyde which comprises substantially simultaneously passing butyraldehyde and an excess of air through a column of catalyst solution essentially comprising a cobalt salt dissolved in butyric acid, said solution having been activated to a dark green color by blowing with air, and during the process subjecting the activated catalyst solution containing butyric acid which has been formed by said oxidizing of butyraldehyde to a temperature between 100° C. and 165° C. so that the volume of said catalyst solution remains substantially constant.

RUDOLPH LEONARD HASCHE.